(12) United States Patent
Murst et al.

(10) Patent No.: US 10,480,371 B2
(45) Date of Patent: Nov. 19, 2019

(54) METERING MODULE FOR METERING A REDUCING AGENT

(71) Applicant: Robert Bosch GmbH, Stuttgart (DE)

(72) Inventors: Martin Murst, Bietigheim-Bissingen (DE); Achim Knittel, Ditzingen (DE); Thilo Kreher, Korntal-Muenchingen (DE); Thorsten Rankel, Leonberg (DE); Jochen Winkler, Esslingen (DE); Claudius Henkel, Bietigheim-Bissingen (DE); Gellert Elsoe, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 159 days.

(21) Appl. No.: 15/101,648

(22) PCT Filed: Oct. 2, 2014

(86) PCT No.: PCT/EP2014/071143
§ 371 (c)(1),
(2) Date: Jun. 3, 2016

(87) PCT Pub. No.: WO2015/082094
PCT Pub. Date: Jun. 11, 2015

(65) Prior Publication Data
US 2016/0305298 A1    Oct. 20, 2016

(30) Foreign Application Priority Data
Dec. 3, 2013 (DE) .................. 10 2013 224 739

(51) Int. Cl.
*F01N 3/20* (2006.01)
(52) U.S. Cl.
CPC ........ *F01N 3/2066* (2013.01); *F01N 2450/22* (2013.01); *F01N 2610/00* (2013.01);
(Continued)

(58) Field of Classification Search
CPC ............ F01N 2450/22; F01N 2610/00; F01N 2610/02; F01N 2610/11; F01N 2610/1453; F01N 3/2066; Y02T 10/24
(Continued)

(56) References Cited

U.S. PATENT DOCUMENTS 6,192,677 B1    2/2001  Tost
9,759,113 B2 *  9/2017  Thomas ................... F01N 3/36
(Continued)

FOREIGN PATENT DOCUMENTS

| CN | 101346535 A | 1/2009 |
|---|---|---|
| CN | 101994551 A | 3/2011 |

(Continued)

OTHER PUBLICATIONS

International Search Report for Application No. PCT/EP2014/071143 dated Dec. 15, 2014 (English Translation, 3 pages).

*Primary Examiner* — Phutthiwat Wongwian
*Assistant Examiner* — Diem T Tran
(74) *Attorney, Agent, or Firm* — Michael Best & Friedrich LLP

(57) ABSTRACT

The invention relates to a metering device (10) for introducing a process liquid or auxiliary agent into a flow pipe of an internal combustion engine, in particular for introducing a reducing agent into an exhaust gas pipe (12). Said device comprises an injection valve (22) and a receiving device (50) comprising a heat sink element (46) and a cover element (48). The injection valve (22) and the receiving device (50) are combined to form a structural unit by means of bonded connections (62, 64).

10 Claims, 2 Drawing Sheets

(52) U.S. Cl.
CPC ....... *F01N 2610/02* (2013.01); *F01N 2610/11* (2013.01); *F01N 2610/1453* (2013.01); *Y02T 10/24* (2013.01)

(58) Field of Classification Search
USPC .................................. 60/286, 298, 299, 303
See application file for complete search history.

(56) References Cited

U.S. PATENT DOCUMENTS

2009/0000605 A1\* 1/2009 Craig .................... F01N 3/0253
123/549
2014/0054394 A1\* 2/2014 Bugos ....................... F01N 3/10
239/132.3

FOREIGN PATENT DOCUMENTS

| | | | |
|---|---|---|---|
| DE | 102008041486 | | 2/2010 |
| DE | 102010030920 | \* | 1/2012 |
| DE | 102011006221 | \* | 10/2012 |
| DE | 102011077955 | | 12/2012 |
| DE | 102011086795 | | 5/2013 |
| DE | 102011086798 | | 5/2013 |
| DE | 102012217703 | A1 | 4/2014 |
| DE | 102009047375 | | 12/2014 |
| JP | 2010180863 | A | 8/2010 |
| WO | 2012049175 | | 4/2012 |

\* cited by examiner

METERING MODULE FOR METERING A REDUCING AGENT

BACKGROUND OF THE INVENTION

The invention relates to a dosing device, comprising an injection valve and a receiving device which are combined to form a structural unit by way of cohesive connections.

In known dosing devices for liquid reducing agents, such as are known for example from DE 10 2008 041 486, a dosing module is used which comprises a dosing unit, for example a dosing valve, for the injection of a reducing agent into the exhaust-gas region and which is held by a holding device or an adapter by means of which a connection to the exhaust tract is realized. To be able to introduce the reducing agent into the exhaust gas in an optimum manner, the dosing module must be positioned as close as possible to the hot exhaust tract, wherein maximum temperatures of 700° C. are reached in the exhaust tract of internal combustion engines. Owing to this inevitably high introduction of heat into the dosing module, there is the risk of overheating of the materials, for example of those used for insulators and seals, which permanently impairs the functionality of the dosing unit. For reasons relating to component strength and material protection against overheating, cooling devices are known which are intended to ensure a limit temperature of the dosing module, which is not to be exceeded, of approximately 150° C.

DE 10 2009 047 375 A1 discloses a dosing module for the dosing of a reducing agent into the exhaust tract of an internal combustion engine, which dosing module is assigned a cooling device. Aside from passive cooling by way of cooling fins on the dosing module, use is made of a cooling body filled with a fluid. For example, a cooling housing comprises a metal sleeve and plastics parts, wherein said cooling housing may be of multi-part form and is sealed off by way of O-rings and is mounted on a receiving sleeve of the dosing module.

WO 2012/049175 discloses a holder for an injector, for example for the introduction of a liquid substance into an exhaust gas of an internal combustion engine, wherein the injector is received entirely in a main body and a cap. The main body is formed from metal sheets which are connected to one another, for example by way of a brazed or welded connection, which metal sheets together form a ring-shaped chamber, wherein the injector accommodated therein is radially enclosed by said ring-shaped chamber and thus constitutes a heat barrier. The ring-shaped chamber, which is partially delimited by the housing of the injector, is charged with a cooling medium. The main body and injector housing are adhesively bonded, or connected in positively locking fashion by way of flanging, to one another in the abutment regions. The leak-tightness of the system is achieved by way of at least one seal which supplements the adhesive connections. The use of elastomers for sealing, mounting and/or insulation limits the maximum admissible temperature of the dosing module. Furthermore, the protection of the dosing valve installed in a dosing module with respect to the surroundings, for example spray water, or, on the exhaust-gas side, with respect to the reducing agent, is ensured only to a limited extent.

SUMMARY OF THE INVENTION

According to the invention, a dosing device for the introduction of an operating or auxiliary substance into a flow pipe of an internal combustion engine is proposed, comprising an injection valve and a receiving device which comprises a cooling body element and a cover element, wherein the injection valve and the receiving device are combined to form a structural unit by way of cohesive connections. A dosing device of said type may be used in particular as part of an exhaust-gas aftertreatment system for the denitrogenization of the exhaust gases of internal combustion engines, wherein a reducing agent, for example aqueous urea solution (AdBlue®) is injected into the exhaust pipe of an internal combustion engine.

The dosing device comprises, inter alia, a dosing module which has, arranged in a receiving device, a dosing unit, for example an injection valve, also referred to as dosing valve or injector. The receiving device at least partially, preferably substantially completely, surrounds the injection valve. Furthermore, the receiving device has an attachment region for the connection of the dosing device to the exhaust pipe.

The receiving device is in the form of a multi-part construction comprising at least one cooling body element and one cover element, and is designed to receive the injection valve. The injection valve, at its lower end which faces toward the exhaust pipe and on which a spray hole disk is positioned, is cohesively connected by way of a welded connection to the receiving device or to the cooling body element of the receiving device. Said welded connection imparts a sealing action with respect to the exhaust gas and ensures low thermal resistance between the cooling body element and the spray hole disk received on the lower end of the injection valve.

The injection valve that is received in the receiving device is sealed off with respect to the surroundings also by way of the cover element, which is an element of the receiving device. The injection valve is connected by way of a welded connection to the cover element in an abutment region, and the cover element is in turn connected preferably by way of a cohesive connection, in particular a weld seam, to the cooling body element. The cohesive connections of the individual components by way of welding offers the advantage, inter alia, of substantially complete sealing of the injection valve, without use being made of further sealing elements and thus of materials that are unfavorable with regard to temperature stability.

The cooling body element and cover element are preferably manufactured from thin-walled components, in particular metal sheets, which are connected preferably cohesively to one another. The cooling body element may likewise be a multi-part construction comprising multiple elements connected to one another, wherein a cohesive connection in abutment regions of the individual elements is preferable.

The cooling body element has a structure of complex shape, which forms inter alia a cavity which can be charged with a cooling medium. A cavity formed in this way provides a ring-shaped chamber, wherein a cooling medium inlet and outlet is provided on the cooling body element in order for the ring-shaped chamber to be charged with cooling medium. The cavity at least partially, preferably substantially completely, surrounds the received injection valve and provides a large receiving volume for the cooling medium. Furthermore, the ring-shaped chamber of the cooling body element may be divided by way of dividing elements such that the cooling medium is conducted within the ring-shaped chamber along a flow path which is configured for optimum cooling of the injection valve. The cooling medium that enters at low temperature passes along the flow path for example into the region of the injection valve, in which relatively high temperatures prevail. Owing to the temperature conditions, an improved cooling action for the injection valve is achieved. Depending on the usage situation and cooling power to be provided, the cooling medium that enters may also have other flow paths imparted to it in the region of the injection valve. Furthermore, by way of the predefined flow path, the flow of the cooling medium is influenced such that a predominantly turbulent flow exists, and dead spaces are substantially avoided, wherein the dissipation of heat is improved. The cooling medium may be a liquid or a gas mixture, for example cooling water, water, fuel or reducing agent or air.

Furthermore, the receiving device is designed such that the injection valve is surrounded by the cooling body element in the manner of a sleeve, wherein a radial sleeve chamber that is formed between the injection valve and the cooling body element extends in particular as far as into the region of the tip of the injection valve. The sleeve chamber, which is sealed off with respect to the surroundings, may accommodate a medium, for example air, thermally conductive paste, oil or other suitable media which assist a transfer of heat between injection valve and cooling body element.

For the radial retention of the injection valve in the receiving device, it is furthermore provided that, in the radial sleeve chamber formed between injection valve and cooling body element, there is arranged a holding element which positions the injection valve radially. The holding element may be designed in the form of a ring-shaped thermally conductive body, such that a heat flow entering the injection valve from the tip is dissipated by way of thermal contact to the holding element and onward to the cooling body element. Thus, by way of the holding element, a simple fastening of the injection valve to the receiving device, and an effective dissipation of heat into the cooling body element of the receiving device, are achieved.

The injection valve and receiving device are subject to different length expansions in the event of temperature changes, which length expansions lead to mechanical stresses in particular at the connecting points. For the elastic compensation of different thermal changes in length of the injection valve on the one hand and of the receiving device on the other hand, at least one expansion compensation means is provided. The at least one expansion compensation means, which is for example integrated into the cover element, preferably compensates all of the occurring length differences of the components that are connected to one another. In one embodiment, the expansion compensation means may be in the form of a spring element or a corrugated bellows, and may be arranged between the injection valve and receiving device.

A refinement of the dosing device provides that an electrical terminal and an actuation means of the injection valve for the control of the dosing of reducing agent are provided, wherein the cover element comprises a corresponding lead-through which has a means for sealing with respect to the surroundings. For example, a fastening may be realized by way of a positively locking connection by means of flanging.

By way of the solution proposed according to the invention, of the dosing device having an injection valve and having a receiving device connected thereto to form a structural unit by way of cohesive connections, optimum protection with respect to external media, for example spray water, is achieved. Simple structural measures and reduced manufacturing outlay for the receiving device, comprising a cooling body element and a cover element, reduce the manufacturing costs and the weight of the construction.

For the injection valve, which is cooled in optimized fashion, increased robustness with respect to temperature loads is realized. In particular, because the reducing agent that is introduced into the exhaust pipe by the injection valve changes into the vapor phase in the presence of a temperature higher than 140° C. to 160° C., it is possible, with an improved dissipation of heat, to prevent boiling within the injection valve. Owing to the improved cooling of the injection valve in combination with insulation with respect to the surroundings, the arrangement of the dosing device for a reducing agent can be optimized.

The connection of the injection valve to the receiving device by way of cohesive welded connections offers optimum sealing without the use of additional seals, which are problematic with regard to their temperature stability.

Further advantages include the fact that the receiving device, and/or the cooling body element and the cover element, can be manufactured from thin metal sheets, whereby a weight saving and simple manufacturing are possible. Furthermore, the cooling body element can, by way of dividing elements, be designed optimally for the throughflow of a cooling medium.

Furthermore, the mounting of the injection valve, and the compensation of expansions induced by temperature changes in the dosing device according to the invention, can be made possible in a simple manner. In accordance with the solution proposed according to the invention, the injection valve is virtually completely surrounded by the cooling medium. The cooling medium jacket surrounding the injection valve as a thermal barrier is virtually complete in a radial direction. With the solution proposed according to the invention, it can furthermore be achieved that the injection valve can be installed in optimum fashion in a manner dependent on its installation location and its operating conditions. In a manner dependent on whether the injection valve is used at an installation location exposed to high temperatures or at a location which is sensitive with regard to acoustics, it is possible to realize an appropriate attachment of the injection valve in optimum fashion in a receiving device for the injection valve. With regard to a temperature-resistant installation location, improved heat dissipation can be allowed for through the selection of suitable materials and of a suitable temperature level of the cooling medium. By contrast, if the injection valve is used in an acoustically sensitive location, then by way of correspondingly optimized installation, sound propagation in the receiving device of the injection valve can be realized without the provision of sound transmission bridges.

BRIEF DESCRIPTION OF THE DRAWINGS

Further advantages and embodiments of the subjects according to the invention will be illustrated by the drawings and discussed in more detail in the following description.

In the drawings.

DETAILED DESCRIPTION

Figure 1:
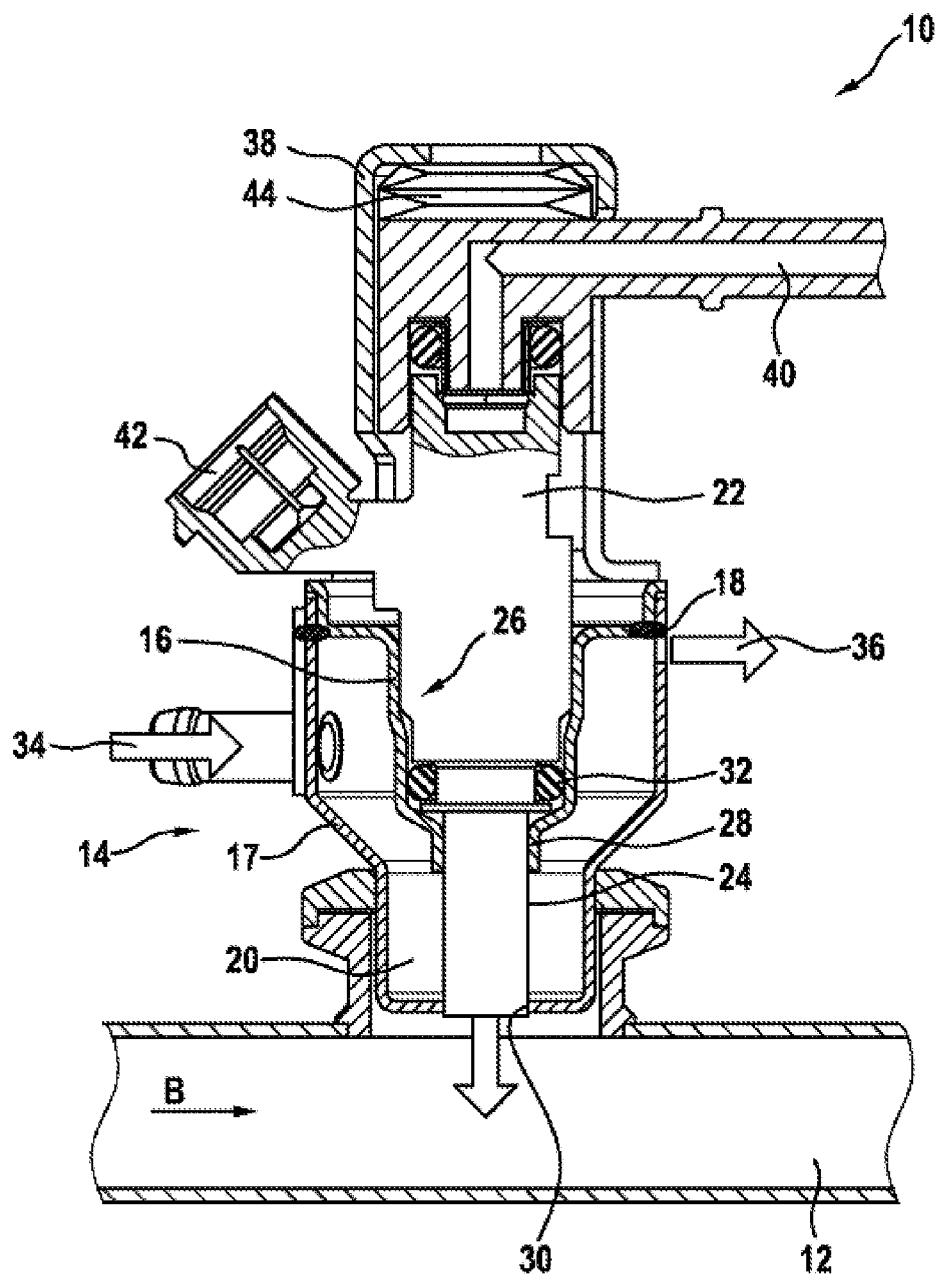
FIG. 1 shows a cross section through a dosing device with a holder and with an integrated injection valve.

FIG. 1 shows a dosing device 10 for use in SCR systems for the dosing of reducing agent into an exhaust pipe 12, wherein an exhaust-gas flow passes through the exhaust pipe 12 in a flow direction B. The exhaust-gas flow originates from an internal combustion engine which is not illustrated in FIG. 1 and to which, at the outlet side, the exhaust pipe 12 is connected. The dosing device 10 comprises a main body 14 which is formed from a first metal sheet 16 and from a second metal sheet 17, which are connected to one another in an abutment region or an overlap region by way of a brazed connection 18. The metal sheets 16 and 17 are spaced apart from one another and form a ring-shaped chamber 20. Furthermore, in the main body 14, there is received an injection valve 22, the housing of which is denoted by 24. The contour of the first metal sheet 16 is in this case selected such that a matching receptacle 26 for the injection valve 22 is formed. The injection valve 22 forms, with the first metal sheet 16 and the second metal sheet 17, abutment regions which are formed as adhesive connections 28 and 30, wherein the ring-shaped chamber 20 is delimited at one side by the first and the second metal sheet 16, 17 and at the other side by the housing 24 of the injection valve 22. For the purposes of sealing the ring-shaped chamber 20, an additional seal 32, for example in the form of an O-ring, is additionally provided, adjacent to the adhesive connection 28. On the second metal sheet 17 there are provided a cooling medium inlet 34 and a cooling medium outlet 36, by way of which the ring-shaped chamber 20 is charged with a cooling medium. Above the main body 14 there is provided a cap 38 on which there is provided an injection fluid port 40. The cap 38 and the main body 14 are connected to one another by way of a brazed connection that is not explicitly illustrated. Illustrated between the main body 14 and the cap 38 is an electrical terminal 42 of the injection valve 22, wherein control lines may also be connected there. For the compensation of a change in volume of an injection fluid situated within the dosing device 10 as a result of formation of ice, a disk spring as an expansion compensation means 44 is provided in the region of the cap 38.

Figure 2:
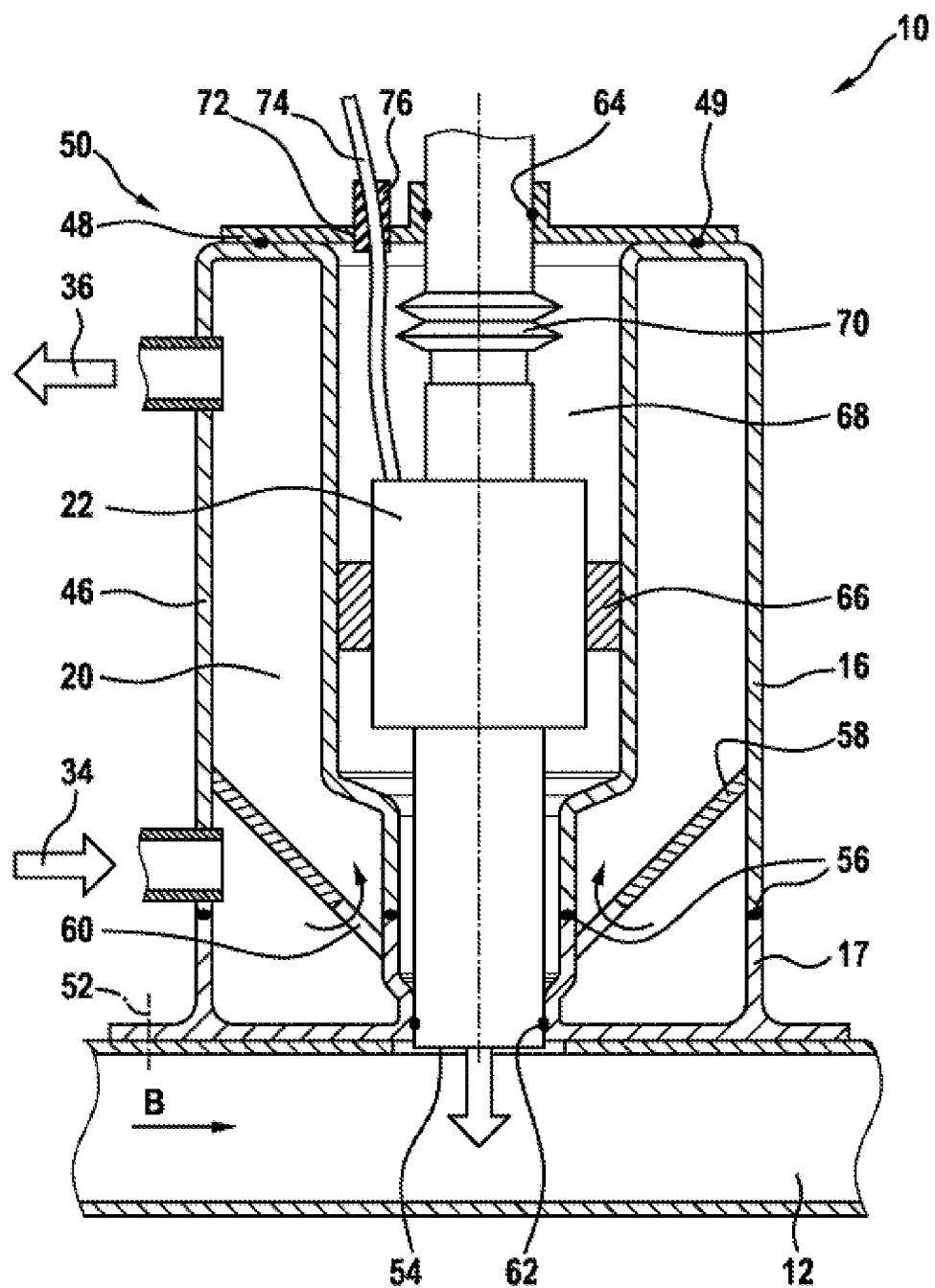
FIG. 2 shows a cross section through a design variant of a dosing device proposed according to the invention.

FIG. 2 shows a possible design variant of the dosing device 10 proposed according to the invention, wherein similar elements are denoted correspondingly to the designations used in FIG. 1.

In the dosing device 10, a cooling body element 46 and a cover element 48 are combined to form a receiving device 50, said cooling body element and cover element being sealingly connected to one another for example by way of a weld seam 49. The dosing device 10 is arranged on the exhaust pipe 12, wherein, for example, a flange connection 52 is provided, by way of which the dosing device 10 can be connected to the exhaust pipe 12. Alternatively, said connection may also be produced by way of a welded connection or by flanging. The dosing device 10 comprises the injection valve 22 or an injector, by way of which the reducing agent, for example AdBlue®, is introduced into the exhaust-gas flow. The temperature of the exhaust gas flowing in the flow direction B may reach 700° C. at this location. Accordingly, at this location, the exhaust pipe 12 is heated, whereby the injection valve 22, and in particular its lower end on which a spray hole disk 54 is situated, is subject to extremely high thermal loads. Accordingly, cooling of the injection valve 22 is necessary, which cooling prevents damage to the dosing device 10.

According to the invention, cooling is achieved by way of a cooling body element 46 in the form of a thin-walled construction. The cooling body element 46 may be manufactured from multiple metal sheets which have a structure of greater or lesser complexity and which are welded to one another at corresponding abutment regions. In the design variant as per FIG. 2, the metal sheets 16, 17 are formed in a structure and are cohesively connected to one another at welded connections 56.

The metal sheets 16, 17 thus connected to one another delimit the ring-shaped chamber 20 which can be charged with a cooling medium via the cooling medium inlet and outlet 34, 36. As cooling medium, use may be made of a liquid, for example water, cooling water, fuel or the reducing agent. Also illustrated in FIG. 2 are dividing elements 58 which further divide the ring-shaped chamber 20, wherein the individual regions of the ring-shaped chamber 20 that are thus formed are in fluidic contact with one another via openings 60 provided on the dividing elements 58. In this way, the cooling medium has imparted to it a flow path which permits optimized cooling.

The injection valve 22 is received in the receiving device 50, wherein the cooling body element 46 substantially completely surrounds the injection valve 22. The injection valve 22 is, at its lower end in the region of the spray hole disk 54, connected sealingly to the receiving device 50, that is to say to the cooling body element 46, by way of a cohesive connection in the form of a weld seam 62. Furthermore, the injection valve 22 is, at its upper end, connected to the cover element 48 of the receiving device 50, likewise cohesively by way of a welded connection 64, in an abutment region. Thus, the injection valve 22 is received in the receiving device 50, wherein said injection valve is sealed off with respect to the surroundings by way of welded connections, without the need for additional sealing elements.

Furthermore, a holding element 66 is provided for the radial positioning of the injection valve 22 in the receiving device 50, which holding element is provided in a radial sleeve chamber 68 formed between the injection valve 22 and the cooling body element 46. The holding element 66 may be in the form of a ring-shaped thermally conductive body and held in the receiving device 50, or in the radial sleeve chamber 68, with an interference fit. In this way, the injection valve 22 is also held at least indirectly in the receiving device 50, and heat dissipation is realized. The sleeve chamber 68, which is sealed off by way of the welded connections in the form of weld seams 62 and 64, can be filled with a medium which serves for the improved dissipation of the heat that is introduced into the injection valve 22 from the lower end. Suitable media are air, thermally conductive paste, oil etc., wherein, for more efficient cooling owing to improved heat transfer, the thermally conductive medium substantially surrounds the injection valve 22 as far as into the region of the spray hole disk 54.

The injection valve 22 and the receiving device 50 exhibit different changes in volume or length in the event of temperature changes. To realize compensation of the different thermal changes in length, an expansion compensation element 70 is received between the receiving device 50, in particular the cover element 48, and the injection valve 22. The expansion compensation element 70 may be in the form of a disk spring or, as indicated in FIG. 2, in the form of a corrugated bellows, wherein a relative movement is possible for pressure relief purposes.

Furthermore, on the cover element 48, there is provided a leadthrough 72 for an electric actuation means, indicated by an electrical terminal 74 of the injection valve 22, wherein the leadthrough 72 has a seal 76.

A major advantage of this embodiment consists in that, owing to the cohesive connections of the individual components of the dosing device 10, no additional sealing elements have to be provided. Furthermore, the lightweight construction of the receiving device 50 advantageously makes it possible to realize an inexpensive construction which is optimized with regard to cooling of the injection valve 22 received therein.

The invention is not restricted to the exemplary embodiments described here and to the aspects highlighted therein. Rather, within the scope specified by the claims, numerous modifications are possible which fall within the capabilities of a person skilled in the art.

What is claimed is:

1. A dosing device for the introduction of a substance into a flow pipe of an internal combustion engine, the dosing device comprising an injection valve and a receiving device, the receiving device having a cooling body element that includes at least one thin-walled component that at least Partially defines a chamber to be charged with a cooling medium, wherein the injection valve and the receiving device are combined to form a structural unit, wherein the injection valve is, at a lower end in a region of a spray hole disk, directly connected cohesively and sealingly to the at least one thin-walled component of the cooling body element by a first weld seam, wherein a second weld seam cohesively and sealingly connects the injection valve, at an upper end, to a cover element of the receiving device.

2. The dosing device as claimed in claim 1, characterized in that the cover element is connected by a third weld seam to the cooling body element.

3. The dosing device as claimed in claim 1, characterized in that the cooling body element is a multi-part construction composed of thin-walled components which are cohesively connected to one another in such a way that a ring-shaped chamber is formed which is connectable to a cooling medium inlet and to a cooling medium outlet in order for the ring-shaped chamber to be charged with the cooling medium, wherein a flow path defined by dividing elements is imparted to the cooling medium.

4. The dosing device as claimed in claim 1, characterized in that, between the cooling body element and the injection valve received in the receiving device, there is formed a sleeve chamber which completely surrounds the injection valve.

5. The dosing device as claimed in claim 4, characterized in that the sleeve chamber is filled with a fluid which promotes a heat transfer.

6. The dosing device as claimed in claim 1, characterized in that the injection valve is positioned in the receiving device in a radial direction by a holding element.

7. The dosing device as claimed in claim 6, characterized in that the holding element is a ring-shaped thermally conductive body which is accommodated in a region of the sleeve chamber.

8. The dosing device as claimed in claim 1, characterized in that, for compensation of different thermal length expansions of the injection valve and the receiving device, an expansion compensation element is provided.

9. The dosing device as claimed in claim 8, characterized in that the expansion compensation element is a spring element or a corrugated bellows.

10. The dosing device as claimed in claim 2, characterized in that, on the cover element there is provided a leadthrough, which can be sealed off, for an electric terminal of the injection valve.

* * * * *